United States Patent
Tanaka (10) Patent No.: US 7,868,948 B2
(45) Date of Patent: Jan. 11, 2011

(54) MAGE SIGNAL PROCESSING APPARATUS, IMAGE SIGNAL PROCESSING METHOD AND PROGRAM FOR CONVERTING AN INTERLACED SIGNAL INTO A PROGRESSIVE SIGNAL

(75) Inventor: Tetsuro Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1160 days.

(21) Appl. No.: 11/517,249

(22) Filed: Sep. 8, 2006

(65) Prior Publication Data

US 2007/0103589 A1 May 10, 2007

(30) Foreign Application Priority Data

Sep. 12, 2005 (JP) .............................. 2005-263302

(51) Int. Cl.
*H04N 7/01* (2006.01)
(52) U.S. Cl. ....................... 348/448; 348/452; 348/451; 348/459; 348/911
(58) Field of Classification Search ................. 348/452, 348/451, 448, 459, 441, 910, 911, 97, 431.1; 386/131
See application file for complete search history.

(56) References Cited

U.S. PATENT DOCUMENTS

| 7,082,161 B2 * | 7/2006 | Sumiyoshi et al. ..... 375/240.01 |
| 7,098,958 B2 * | 8/2006 | Wredenhagen et al. ..... 348/452 |
| 7,432,979 B2 * | 10/2008 | Tanaka ......... 348/448 |
| 7,612,829 B2 * | 11/2009 | Chow ......... 348/452 |

* cited by examiner

*Primary Examiner*—David L Ometz
*Assistant Examiner*—Jean W Désir
(74) *Attorney, Agent, or Firm*—Oblon, Spivak, McClelland, Maier & Neustadt, L.L.P.

(57) ABSTRACT

Disclosed herein is an image signal processing apparatus configured to convert an interlaced signal into a progressive signal, including: a first conversion unit; a second conversion unit; a decision unit; and a selection unit.

6 Claims, 8 Drawing Sheets

IMAGE SIGNAL PROCESSING APPARATUS, IMAGE SIGNAL PROCESSING METHOD AND PROGRAM FOR CONVERTING AN INTERLACED SIGNAL INTO A PROGRESSIVE SIGNAL

CROSS REFERENCES TO RELATED APPLICATIONS

The present invention contains subject matter related to Japanese Patent Application JP 2005-263302 filed in the Japanese Patent Office on Sep. 12, 2005, the entire contents of which being incorporated herein by reference.

BACKGROUND OF THE INVENTION

1. Field of the Invention

This invention relates to an image signal processing apparatus, an image signal processing method and a program, and more particularly to an image signal processing apparatus, an image signal processing method and a program suitable for use for conversion of an interlaced signal into a progressive signal.

2. Description of the Related Art

In order to enhance the picture quality (by removal of line flickering and so forth) of an image to be displayed on a display unit of a television receiver or the like, an IP conversion process is used. The IP conversion process converts an image signal of the interlaced type (a signal of the type described is hereinafter referred to as interlaced signal) into another image signal of the progressive type (a signal of the type described is hereinafter referred to as progressive signal). The IP conversion process has been popularized as a technique for a fixed pixel display unit such as a liquid crystal display unit or a plasma display unit. In the following, a television system is described taking the NTSC (National Television System Committee) system as an example.

The IP conversion process can be implemented by various methods in response to the type of an interlaced signal prior to the IP conversion including 2·3 pull-down inverse conversion, 2·2 pull-down inverse conversion, motion adaptive IP conversion and motion compensated IP conversion.

In order to convert an interlaced signal of film material, the 2·3 pull-down inverse conversion or the 2·2 pull-down inverse conversion is applied. The film material here is obtained by conversion of material produced by picking up 24 or 30 images per second using a film camera which is used for image pickup, for example, for a movie into an interlaced signal of 60 images per second by 3·2 pull-down telecine conversion or 2·2 pull-down telecine conversion by means of a telecine apparatus. A progressive signal which is a result of IP conversion by the 2·3 pull-down inverse conversion or the 2·2 pull-down inverse conversion includes reproduced original images of the film material before the telecine conversion and does not give rise to generation of line flickering when it is reproduced.

On the other hand, in order to IP convert an interlaced signal of video material, the motion adaptive IP conversion or the motion compensated IP conversion is suitably applied. The video material is obtained by picking up images in accordance with the interlaced system using a video camera.

In the motion adaptive IP conversion, where pixels in each even-numbered (odd-numbered) line to be interpolated in each odd-numbered (even-numbered) field do not involve any motion (any temporal variation), those pixels which exist in even-numbered (odd-numbered) lines of a pair of even-numbered (odd-numbered) fields preceding and succeeding the odd-numbered (even-numbered) field are used to perform the interpolation. On the other hand, where the pixels in each even-numbered (odd-numbered) line to be interpolated in each odd-numbered (even-numbered) field involve some motion (some temporal variation), those pixels which exist in the odd-numbered (even-numbered) line in the odd-numbered (even-numbered) field are used to perform interpolation.

With the motion adaptive IP conversion, line flickering is removed from a still picture which does not include any motion, but even with an image which includes motion, line flickering is reduced when compared with an alternative case wherein IP conversion suitable for the film material is applied.

Therefore, such a countermeasure as described just below is taken popularly. In particular, it is first decided whether an interlaced signal before IP conversion is performed is of film material or video material. Then, either a progressive signal for which the IP conversion for film material is applied or another progressive signal for which the IP conversion for video material is applied is outputted based on a result of the decision. The countermeasure is disclosed, for example, in Japanese Patent Laid-Open No. 2004-96223.

SUMMARY OF THE INVENTION

Incidentally, ordinary video cameras output an interlaced signal of video material. However, some of less expensive video cameras output an interlaced signal which has a characteristic of film material (details are hereinafter described).

For example, an ordinary video camera has a vertical resolution of approximately 480 lines, one half of which is allocated to an odd-numbered field while the other half is allocated to an even-numbered field. However, some less expensive video camera has a vertical resolution of approximately 240 lines, which are used commonly for an odd-numbered field and an even-numbered field.

An interlaced signal outputted from such a less expensive video camera as just described is decided to have a characteristic of film material. However, if the IP conversion suitable for film material is applied to the interlaced signal, then the picture quality is deteriorated when compared with that in an alternative case wherein the motion adaptive IP conversion is applied to the interlaced signal.

Accordingly, it is necessary to distinguish an interlaced signal outputted from such a less expensive video camera as described above and having a characteristic of film material and apply IP conversion suitable for video material to the distinguished interlaced signal.

Thus, it is desirable to provide an image signal processing apparatus, an image signal processing method and a program by which suitable IP conversion can be selected in response to an interlaced signal.

According to an embodiment of the present invention, there is provided an image signal processing apparatus for converting an interlaced signal into a progressive signal, comprising a first conversion unit configured to convert the interlaced signal into a progressive signal by 2·2 pull-down inverse conversion, a second conversion unit configured to convert the interlaced signal into a progressive signal by motion adaptive IP conversion, a decision unit configured to arithmetically operate a correlation value S of two successive field images of the interlaced signal and decide based on the correlation value S whether or not the two successive field images originate from a single frame image wherein the number of pixels in a vertical direction is equal to that of the field images, and a selection unit configured to select a result of the conversion by the first conversion unit or a result of the conversion by the second conversion unit in response to a result of the decision by the decision unit.

The decision unit may arithmetically operate the correlation value S in accordance with the following expressions $p=\Sigma|f1(x,y)-f2(x,y-1)|$ $q=\Sigma|f1(x,y)-f2(x,y+1)|$ $S=p/q$ where $p>q$ $S=q/p$ where $q \geq p$ where x is the horizontal coordinate of a pixel, y the vertical coordinate of the pixel, y−1 the vertical coordinate of another line immediately below the line of the vertical coordinate y, y+1 the vertical coordinate of a further line immediately above the line of the vertical coordinate y, f1 the pixel value of the coordinates in the parentheses of one of the field images, f2 the pixel value of the coordinates in the parentheses of the other field image, Σ the total value, and S the correlation value S.

The decision unit may compare the correlation value S with a predetermined threshold value to decide whether or not the two successive field images originate from a single frame image wherein the number of pixels in the vertical direction is equal to that of the field images.

The second conversion unit may use not the motion adaptive IP conversion but motion compensated IP conversion, wherein a pixel is interpolated based on a motion vector between images, to convert the interlaced signal into a progressive signal.

According to another embodiment of the present invention, there is provided an image signal processing method for an image signal processing apparatus for converting an interlaced signal into a progressive signal, comprising the steps of converting the interlaced signal into a progressive signal by 2·2 pull-down inverse conversion, converting the interlaced signal into a progressive signal by motion adaptive IP conversion, arithmetically operating a correlation value S of two successive field images of the interlaced signal and deciding based on the correlation value S whether or not the two successive field images originate from a single frame image wherein the number of pixels in a vertical direction is equal to that of the field images, and selecting a result of the first conversion or a result of the second conversion in response to a result of the decision.

According to a further embodiment of the present invention, there is provided a program for converting an interlaced signal into a progressive signal, the program causing a computer to execute a process comprising the steps of converting the interlaced signal into a progressive signal by 2·2 pull-down inverse conversion, converting the interlaced signal into a progressive signal by motion adaptive IP conversion, arithmetically operating a correlation value S of two successive field images of the interlaced signal and deciding based on the correlation value S whether or not the two successive field images originate from a single frame image wherein the number of pixels in a vertical direction is equal to that of the field images, and selecting a result of the first conversion or a result of the second conversion in response to a result of the decision.

In the image signal processing apparatus and method and the program, the interlaced signal is converted into a progressive signal by the 2·2 pull-down inverse conversion. The interlaced signal is converted also into another progressive signal by the motion adaptive IP conversion. Then, the correlation value S between two successive field signals of the interlaced signal is arithmetically operated. Thereafter, it is decided based on the correlation value S whether or not the two successive field images originate from a single frame image having a number of pixels in the vertical direction which is equal to that of the field images. Finally, the first conversion result or the second conversion result is selected in accordance with a result of the decision.

Consequently, with the image signal processing apparatus and method and the program, appropriate IP conversion can be selected in response to the interlaced signal.

The above and other objects, features and advantages of the present invention will become apparent from the following description and the appended claims, taken in conjunction with the accompanying drawings in which like parts or elements are denoted by like reference symbols.

DETAILED DESCRIPTION OF THE PREFERRED EMBODIMENT

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Figure 1:
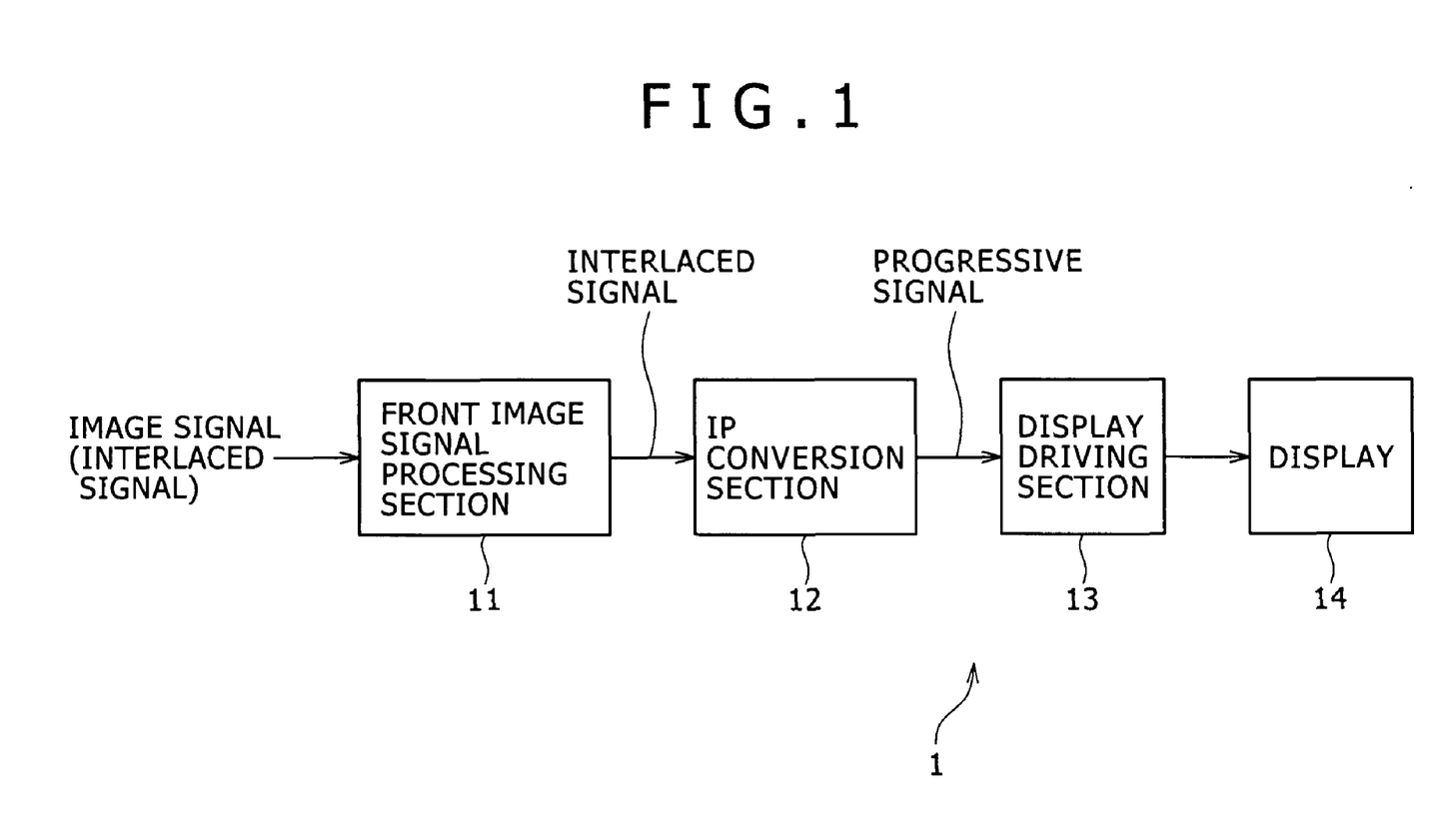
FIG. 1 is a block diagram showing an example of a configuration of an image signal processing apparatus to which the present invention is applied.
Figure 2:
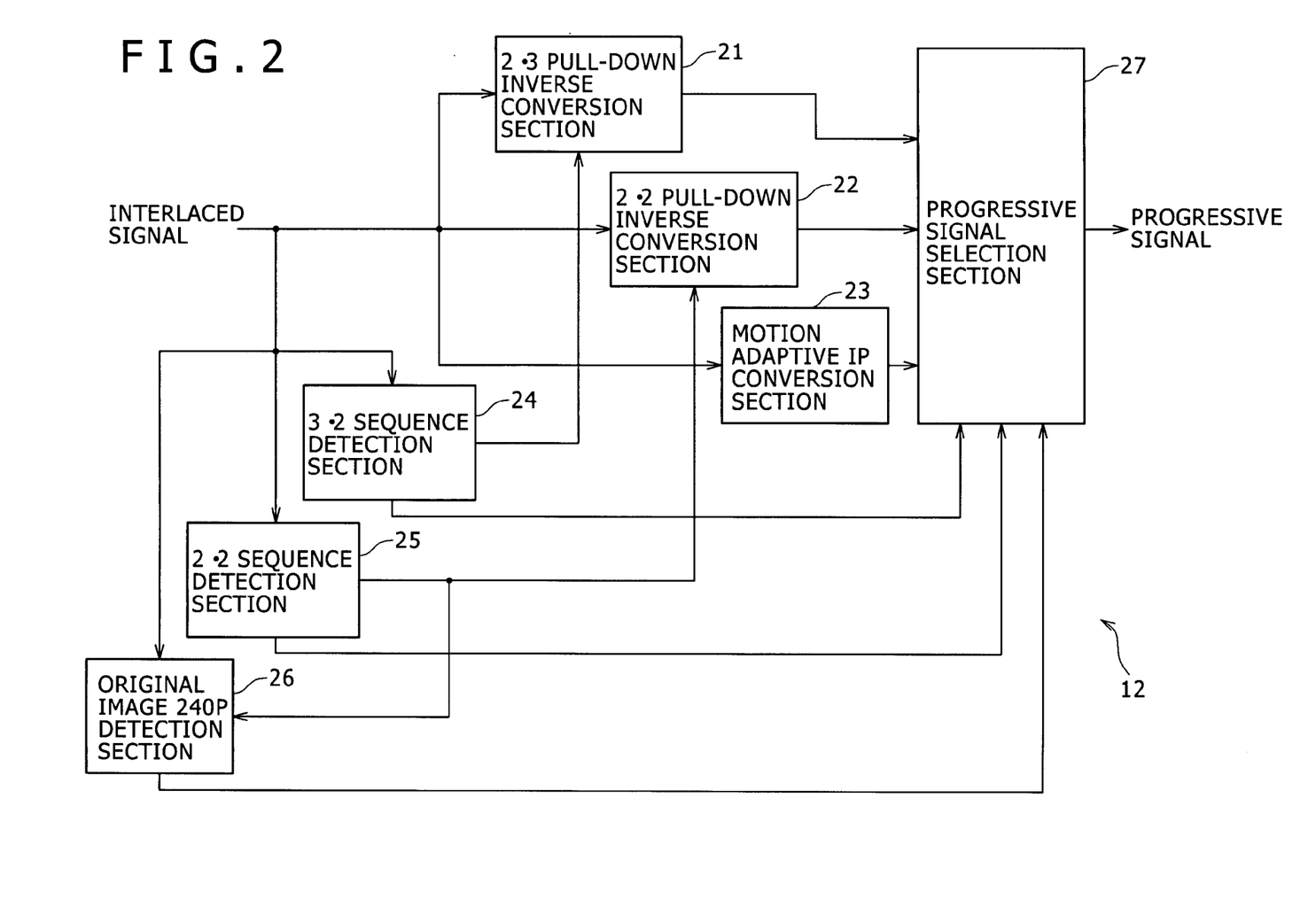
FIG. 2 is a block diagram showing an example of a configuration of an IP conversion section shown in FIG. 1.

An image signal processing apparatus (for example, an IP conversion section 12 of FIG. 1) according to an embodiment of the present invention includes a first conversion unit (for example, a 2·2 pull-down inverse conversion section 22 of FIG. 2) configured to convert the interlaced signal into a progressive signal by 2·2 pull-down inverse conversion, a second conversion unit (for example, a motion adaptive IP conversion section 23 of FIG. 2) configured to convert the interlaced signal into a progressive signal by motion adaptive IP conversion, a decision unit (for example, an original image 240P detection section 26 of FIG. 2) configured to arithmetically operate a correlation value S of two successive field images of the interlaced signal and decide based on the correlation value S whether or not the two successive field images originate from a single frame image wherein the number of pixels in a vertical direction is equal to that of the field images, and a selection unit (for example, a progressive signal selection section 27 of FIG. 2) configured to select a result of the conversion by the first conversion unit or a result of the conversion by the second conversion unit in response to a result of the decision by the decision unit.

Figure 9:
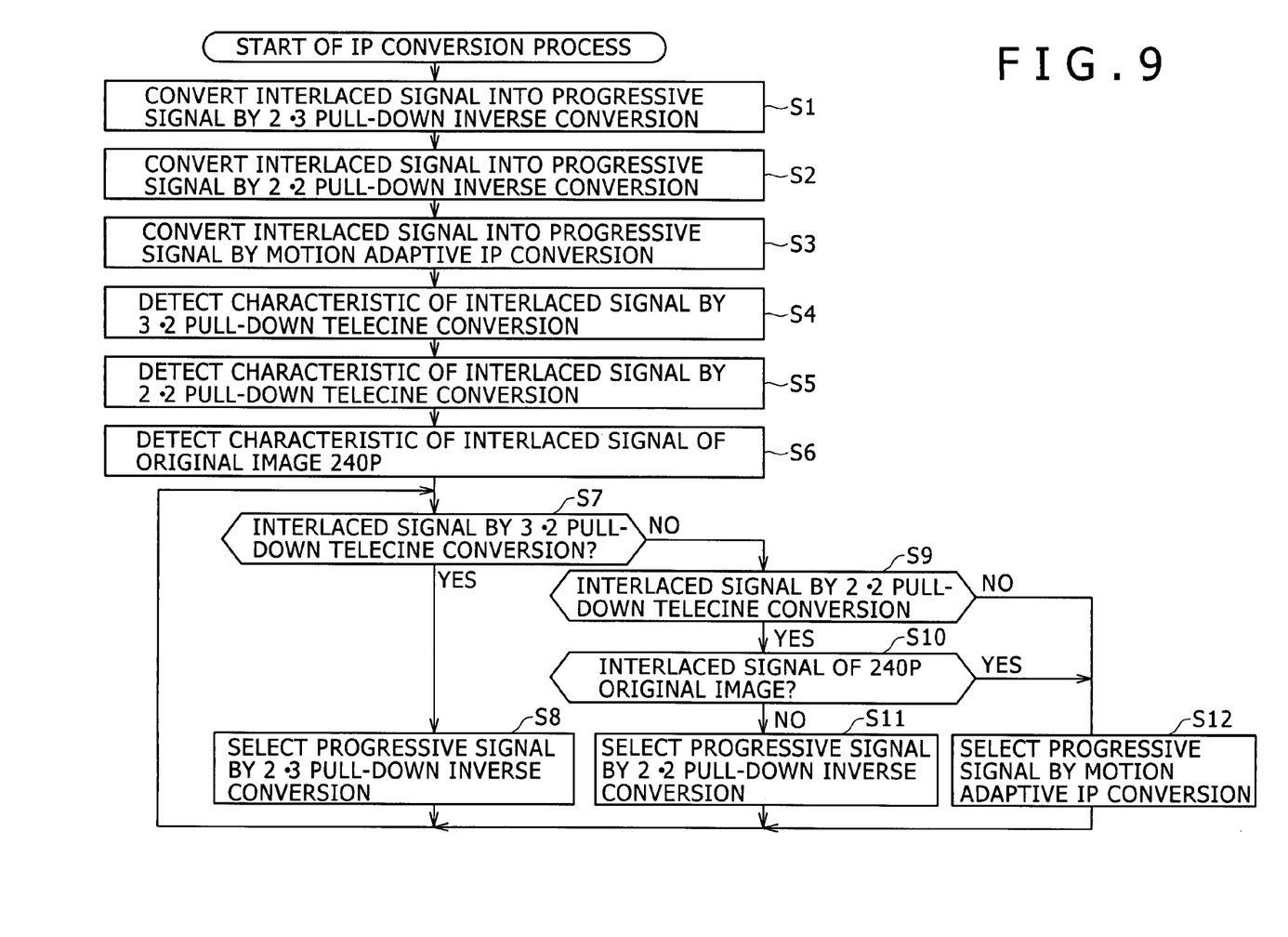
FIG. 9 is a flow chart illustrating action of the IP conversion section.

An image signal processing method or a program includes the steps of converting the interlaced signal into a progressive signal by 2·2 pull-down inverse conversion (for example, a step S2 of FIG. 9), converting the interlaced signal into a progressive signal by motion adaptive IP conversion (for example, a step S3 of FIG. 9), arithmetically operating a correlation value S of two successive field images of the interlaced signal and deciding based on the correlation value S whether or not the two successive field images originate from a single frame image wherein the number of pixels in a vertical direction is equal to that of the field images (for example, a step S6 of FIG. 9), and selecting a result of the first conversion or a result of the second conversion in response to a result of the decision (for example, a step S10 of FIG. 9).

In the following, a particular embodiment to which the present invention is applied is described in detail with reference to the accompanying drawings.

Referring first to FIG. 1, there is shown an example of a configuration of an image signal processing apparatus to which the present invention is applied. The image signal processing apparatus 1 is built typically in a television receiver and converts an interlaced signal into and displays a progressive signal. In the following, an image of an interlaced signal is referred to as field image, and an image of a progressive signal is referred to as frame image.

The image signal processing apparatus 1 includes a front image signal processing section 11, an IP conversion section 12, a display driving section 13, and a display unit 14.

The front image signal processing section 11 performs an AD (analog to digital) conversion process, a chroma decoding process and other necessary processes for an image signal of the interlaced type inputted thereto to produce an interlaced signal. The front image signal processing section 11 outputs the interlaced signal to the IP conversion section 12. The IP conversion section 12 converts the interlaced signal inputted thereto into a progressive signal and outputs the progressive signal to the display driving section 13. The display driving section 13 includes a pixel number conversion circuit called scaler, a panel driver and other necessary components and performs a process suitable for the display unit 14 for the progressive signal inputted thereto from the IP conversion section 12. The display driving section 13 outputs the resulting progressive signal to the display unit 14. The display unit 14 displays an image corresponding to the output of the display driving section 13.

FIG. 2 shows an example of a configuration of the IP conversion section 12.

Referring to FIG. 2, the IP conversion section 12 shown includes a 2·3 pull-down inverse conversion section 21, a 2·2 pull-down inverse conversion section 22, and a motion adaptive IP conversion section 23. The IP conversion section 12 further includes a 3·2 sequence detection section 24, a 2·2 sequence detection section 25, an original image 240P detection section 26, and a progressive signal selection section 27.

The 2·3 pull-down inverse conversion section 21 converts an interlaced signal inputted to the IP conversion section 12 from a preceding stage into a progressive signal by 2·3 pull-down inverse conversion based on a notification from the 3·2 sequence detection section 24. The 2·3 pull-down inverse conversion section 21 outputs the progressive signal to the progressive signal selection section 27. The 2·3 pull-down inverse conversion is IP conversion optimum to an interlaced signal produced by 3·2 pull-down telecine conversion from an original image of film material.

The 2·2 pull-down inverse conversion section 22 converts the interlaced signal inputted to the IP conversion section 12 from the preceding stage into a progressive signal by 2·2 pull-down inverse conversion based on a notification from the 2·2 sequence detection section 25. The 2·2 pull-down inverse conversion section 22 outputs the progressive signal to the progressive signal selection section 27. The 2·2 pull-down inverse conversion is IP conversion optimum to an interlaced signal produced by 2·2 pull-down telecine conversion from an original image of film material.

Figure 3A:
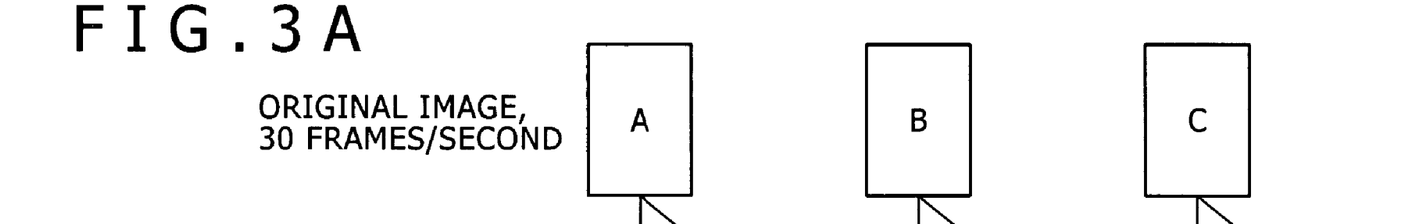
FIGS. 3A to 3C is a diagrammatic view illustrating 2·2 pull-down telecine conversion and 2·2 pull-down inverse conversion.
Figure 3B:
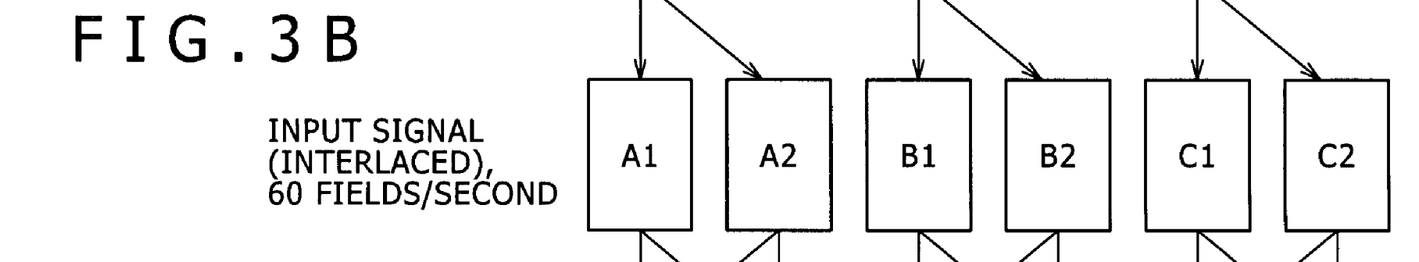
Figure 3C:
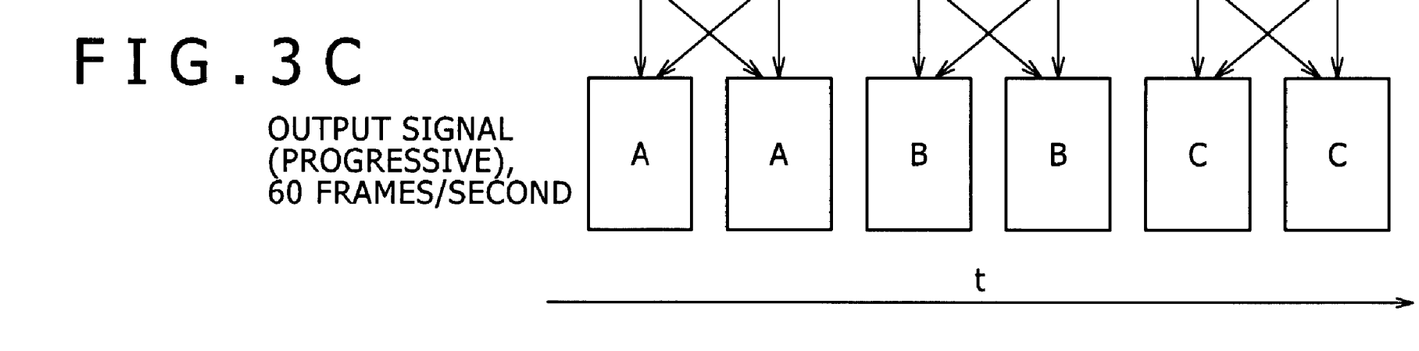

More particularly, as seen in FIGS. 3B and 3C, two successive progressive frame images A are produced based on successive field images A1 and A2. Similarly, two successive frame images B are produced based on successive field images B1 and B2, and two successive frame images C are produced based on successive field images C1 and C2. It is to be noted that a combination of two successive field images complies with a notification from the 2·2 sequence detection section 25.

Referring back to FIG. 2, the motion adaptive IP conversion section 23 converts the interlaced signal inputted from the preceding stage into a progressive signal by motion adaptive IP conversion. The motion adaptive IP conversion section 23 outputs the progressive signal to the progressive signal selection section 27. The motion adaptive IP conversion is IP conversion optimum to an interlaced signal of video material.

Figure 4A:
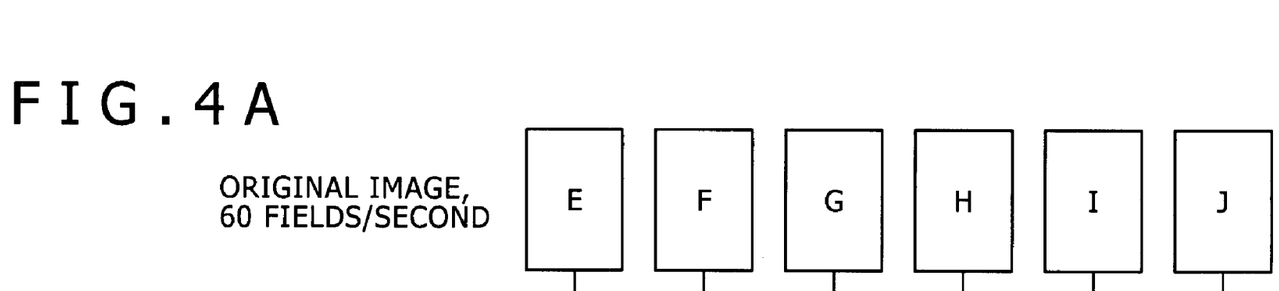
FIGS. 4A, 4B, 4C and 5 are diagrammatic views illustrating motion adaptive IP conversion.
Figure 4B:
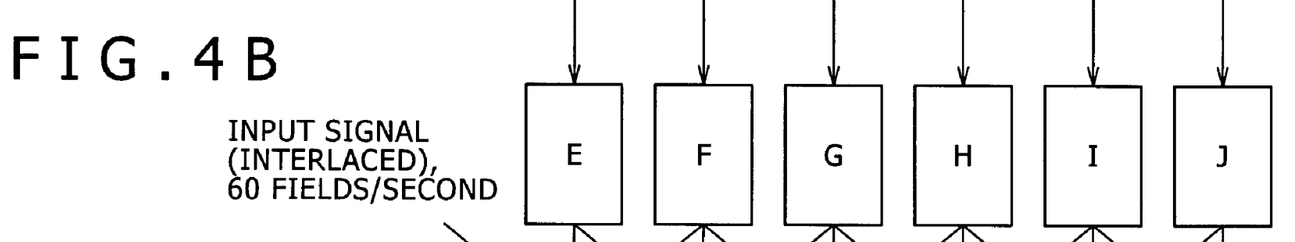
Figure 4C:
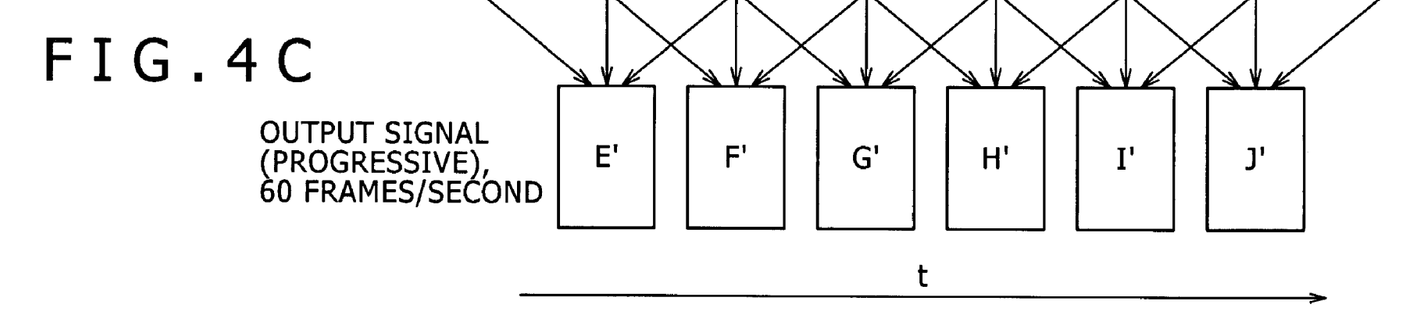
Figure 5:
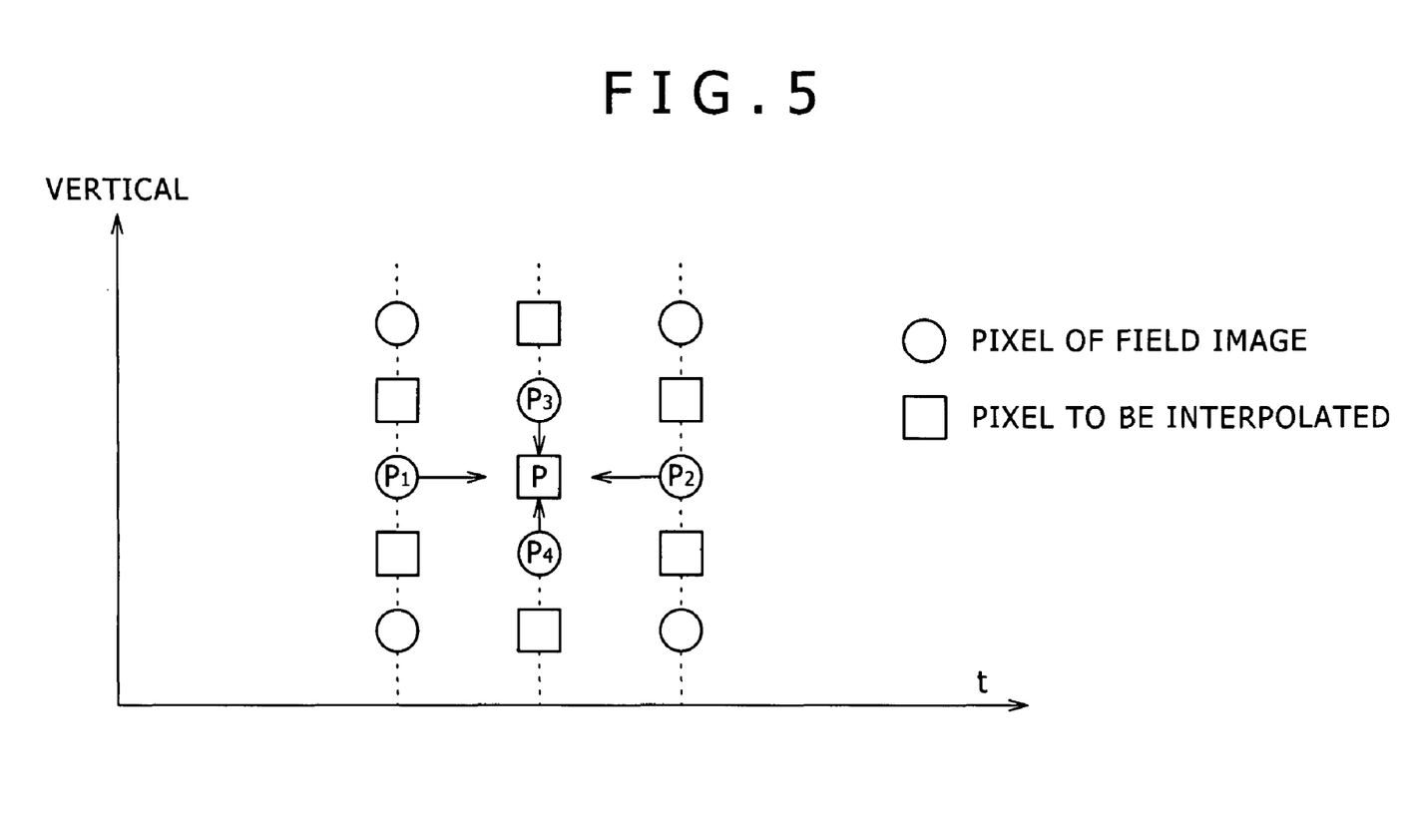

In particular, referring to FIGS. 4A to 4C, the motion adaptive IP conversion section 23 produces a frame image F' based on the interlaced above-mentioned field images E, F and G which successively appear with respect to time. Similarly, the motion adaptive IP conversion section 23 produces a frame image G' based on the above-mentioned interlaced field images F, G and H which successively appear with respect to time. More particularly, referring to FIG. 5, if a pixel P of a frame image (for example, F') produced exhibits no motion, that is, no variation with respect to time, then pixels existing in field images which appear successively with respect to time, in the present case, a pixel P1 of the field image E and a pixel P2 of the field image G, are used to perform interpolation. On the other hand, if the pixel P exhibits some motion, that is, some variation with respect to time, pixels existing in the corresponding field image, in the present case, pixels P3 and P4 of the field image F, are used to perform interpolation.

Referring back to FIG. 2, the 3·2 sequence detection section 24 decides whether or not the interlaced signal inputted from the preceding stage has a characteristic of an interlaced signal produced by 3·2 pull-down telecine conversion from an original image. If the 3·2 sequence detection section 24 decides that the interlaced signal has the characteristic, then it outputs a 3·2 sequence detection signal to the progressive signal selection section 27. Further, the 3·2 sequence detection section 24 notifies the 2·3 pull-down inverse conversion section 21 of which one of successive field images corresponding to the inputted interlaced signal should be combined to produce a frame image.

The 2·2 sequence detection section 25 decides whether or not the interlaced signal inputted from the preceding stage has a characteristic of an interlaced signal produced by 2·2 pull-down telecine conversion from an original image picked up at a rate of 30 frames per second. If the 2·2 sequence detection section 25 decides that the interlaced signal has the characteristic, then it outputs a 2·2 sequence detection signal to the progressive signal selection section 27. Further, the 2·2 sequence detection section 25 notifies the 2·2 pull-down inverse conversion section 22 and the original image 240P detection section 26 of which two ones of successive field images corresponding to the inputted interlaced signal should be combined to produce a frame image.

Here, an example of a decision method by the 2·2 sequence detection section 25 of whether or not an interlaced signal inputted from the preceding stage has the characteristic described above is described.

By the 2·2 pull-down telecine conversion, for example, the field images A1 and A2 shown in FIG. 3B are produced based on the original image A picked up at a rate of 30 frames per second and illustrated in FIG. 3A. Similarly, the field images B1 and B2 are produced based on the original image B, and the field images C1 and C2 are produced based on the original image C. Accordingly, if the differences between two neighboring field images are arithmetically operated and compared with each other, then the difference between the field images A1 and A2, the difference between the field images B1 and B2 and the difference between the field images C1 and C2 are small. However, the difference between field images A2 and B1 and the difference between the field images B2 and C1 are great.

When the magnitude of the difference between two neighboring field images varies alternately to the large difference and the small difference in this manner, the 2·2 sequence detection section 25 decides that the interlaced signal inputted from the preceding stage has a characteristic of an interlaced signal produced by 2·2 pull-down telecine conversion from an original image picked up at a rate of 30 frames per second. The 2·2 sequence detection section 25 thus outputs a 2·2 sequence detection signal to the progressive signal selection section 27.

Referring back to FIG. 2 again, the original image 240P detection section 26 decides whether or not the interlaced signal inputted from the preceding stage has a characteristic of an interlaced signal wherein two field images are produced from a single original image whose vertical resolution is 240 lines. Such an original image as just mentioned is hereinafter referred to as 240P original image. If the original image 240P detection section 26 decides that the interlaced signal has the characteristic, then it outputs an original 240P detection signal to the progressive signal selection section 27.

The progressive signal selection section 27 outputs a progressive signal from the 2·3 pull-down inverse conversion section 21, another progressive signal from the 2·2 pull-down inverse conversion section 22 or a further progressive signal from the motion adaptive IP conversion section 23 to a succeeding stage based on a 3·2 sequence detection signal, a 2·2 sequence detection signal or an original image 240P detection signal.

In particular, if a 3·2 sequence detection signal is inputted, then the progressive signal selection section 27 outputs a progressive signal from the 2·3 pull-down inverse conversion section 21 to the succeeding stage. If a 2·2 sequence detection signal is inputted but an original image 240P detection signal is not inputted, then the progressive signal selection section 27 outputs a progressive signal from the 2·2 pull-down inverse conversion section 22. If none of a 3·2 sequence detection signal and a 2·2 sequence detection signal is inputted or both of a 2·2 sequence detection signal and an original image 240P detection signal are inputted, then the progressive signal selection section 27 outputs a progressive signal from the motion adaptive IP conversion section 23 to the succeeding stage.

Figure 6:
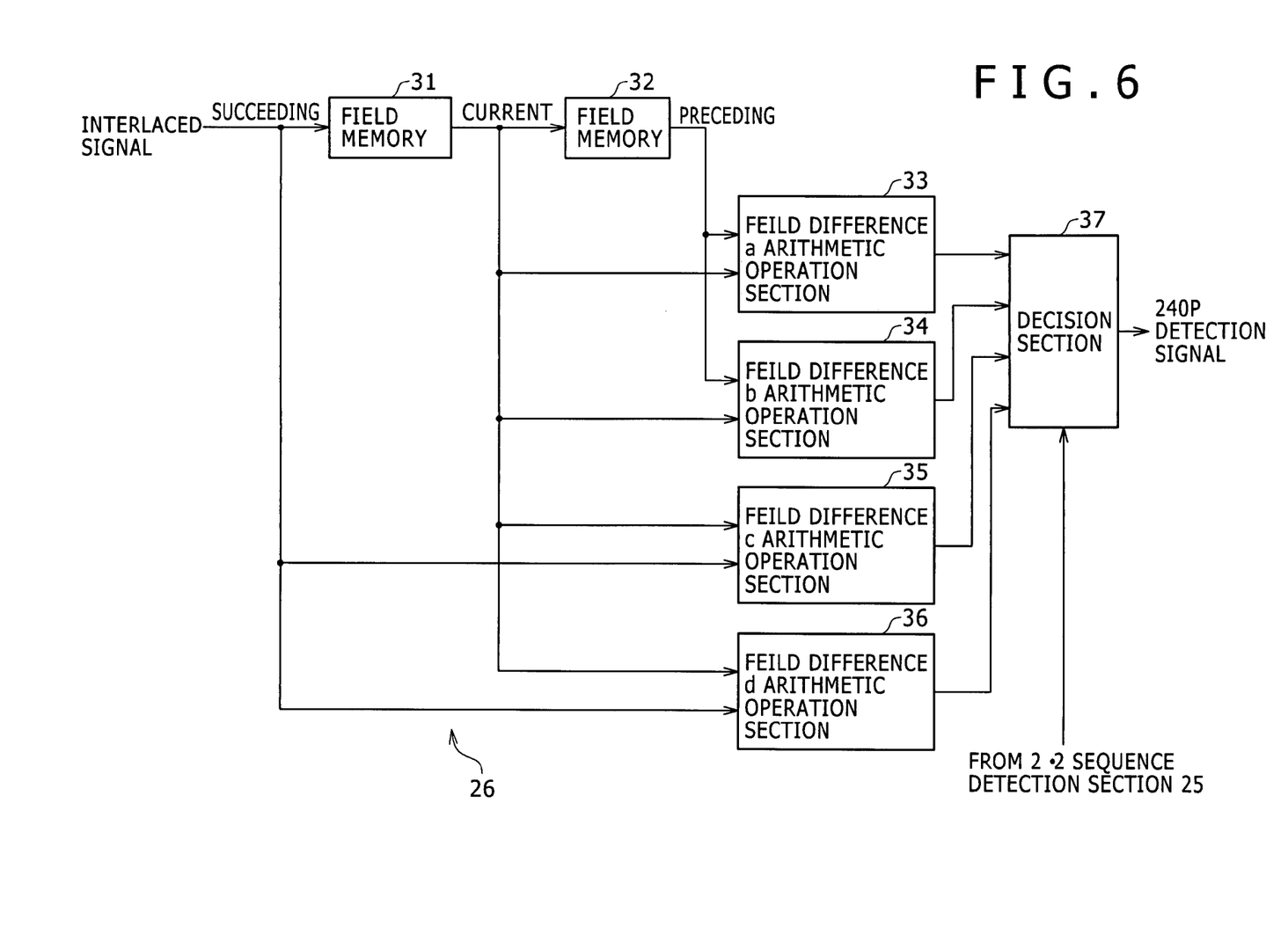
FIG. 6 is a block diagram showing an example of a configuration of an original image 240P detection section shown in FIG. 2.

FIG. 6 shows an example of a configuration of the original image 240P detection section 26. To the original image 240P detection section 26, an interlaced signal is inputted which has signals, from among all lines of one frame composed of an odd-numbered field and an even-numbered field, of the odd-numbered lines in the odd-numbered field and of the even-numbered lines in the even-numbered field. The original image 240P detection section 26 includes field memories 31 and 32 each of which delays the inputted interlaced signal by a one-field period. The original image 240P detection section 26 further includes a field difference a arithmetic operation section 33 and a field difference b arithmetic operation section 34 which arithmetically operate the difference between a field image (hereinafter referred to as current field image) outputted from the field memory 31 and another field image (hereinafter referred to as preceding field image) outputted from the field memory 32. The original image 240P detection section 26 further includes a field difference c arithmetic operation section 35 and a field difference d arithmetic operation section 36 which arithmetically operate the difference between a field image (hereinafter referred to as succeeding field image) inputted from the preceding stage to the original image 240P detection section 26 and the current field image.

Each of the field memories 31 and 32 retains, every time an interlaced signal for one field image is inputted from the respective preceding stage, the interlaced signal for one field image inputted from the preceding stage and outputs an interlaced signal for one field, which has been retained therein so far, to the respective succeeding stage.

The field difference a arithmetic operation section 33 to field difference d arithmetic operation section 36 operate in a different manner depending upon whether the current field image is an odd-numbered field image or an even-numbered field image.

Figure 7:
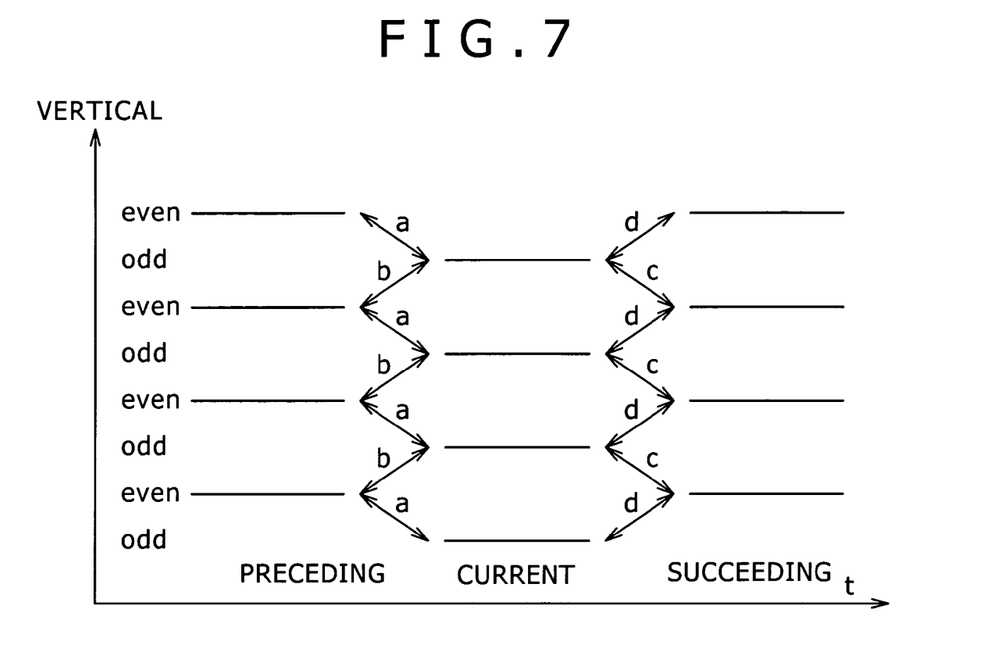
FIGS. 7 and 8 are diagrams illustrating action of the original image 240P detection section.

Referring to FIG. 7, if the current field image is an odd-numbered field image, then the field difference a arithmetic operation section 33 arithmetically operates the sum total a of absolute values of the differences between pixels which have same coordinates in the horizontal direction in the 2mth (m=0, 1, 2, . . . ) line in the vertical direction of the preceding field image and the 2m+1th line of the current field image. The field difference a arithmetic operation section 33 outputs the sum total a of absolute values arithmetically operated in this manner to a decision section 37. The number of the absolute values to be summed here corresponds to the total number of pixels in the horizontal direction and the vertical direction in the field retained in the field memory 31 or the field memory 32. The field difference b arithmetic operation section 34 arithmetically operates the sum total b of absolute values of the differences between pixels which have same coordinates in the horizontal direction in the 2nth (n=1, 2, 3, . . . ) line in the vertical direction of the preceding field image and the 2n−1th line of the current field image. The field difference b arithmetic operation section 34 outputs the sum total b arithmetically operated in this manner to the decision section 37. The field difference c arithmetic operation section 35 arithmetically operates the sum total c of absolute values of the differences between pixels which have same coordinates in the horizontal direction in the 2mth line in the vertical direction of the succeeding field image and the 2m+1th line of the current field image. The field difference c arithmetic operation section 35 outputs the sum total c of absolute values arithmetically operated in this manner to the decision section 37. The field difference d arithmetic operation section 36 arithmetically operates the sum total d of absolute values of the differences between pixels which have same coordinates in the horizontal direction in the 2nth line in the vertical direction of the succeeding field image and the 2n−1th line of the current field image. The field difference d arithmetic operation section 36 outputs the sum total d arithmetically operated in this manner to the decision section 37.

Figure 8:
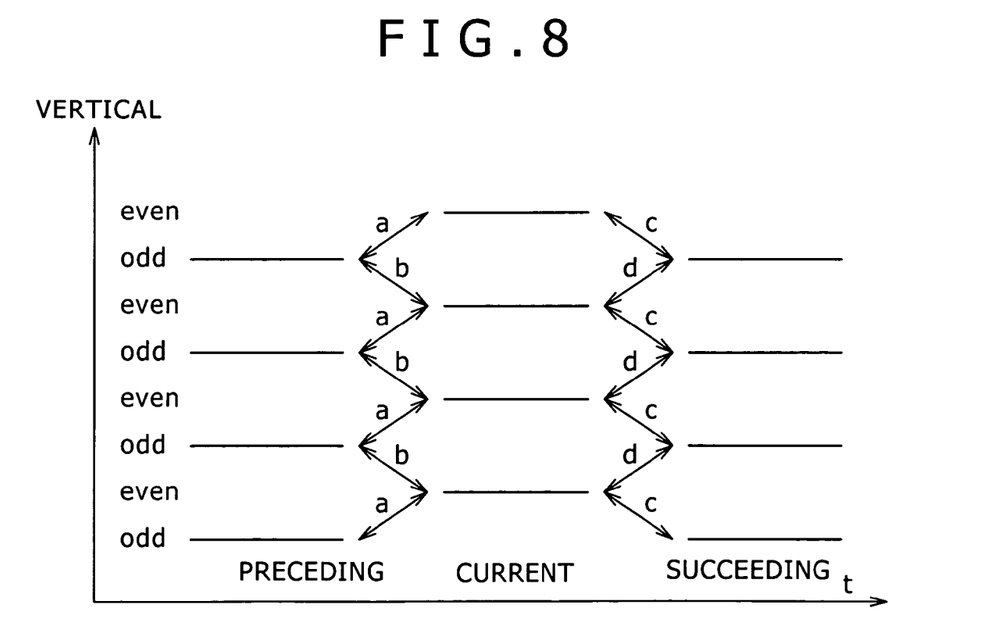

Referring now to FIG. 8, if the current field image is an even-numbered field image, then the field difference a arithmetic operation section 33 arithmetically operates the sum total a of absolute values of the differences between pixels which have same coordinates in the horizontal direction in the 2m+1th (m=0, 1, 2, . . . ) line in the vertical direction of the preceding field image and the 2mth line of the current field image. The field difference a arithmetic operation section 33 outputs the sum total a of absolute values arithmetically operated in this manner to the decision section 37. The field difference b arithmetic operation section 34 arithmetically operates the sum total b of absolute values of the differences between pixels which have same coordinates in the horizontal direction in the 2n−1th (n=1, 2, 3, . . . ) line in the vertical direction of the preceding field image and the 2nth line of the current field image. The field difference b arithmetic operation section 34 outputs the sum total b arithmetically operated in this manner to the decision section 37. The field difference c arithmetic operation section 35 arithmetically operates the sum total c of absolute values of the differences between pixels which have same coordinates in the horizontal direction in the 2m+1th line in the vertical direction of the succeeding field image and the 2mth line of the current field image. The field difference c arithmetic operation section 35 outputs the sum total c arithmetically operated in this manner to the decision section 37. The field difference d arithmetic operation section 36 arithmetically operates the sum total d of absolute values of the differences between pixels which have same coordinates in the horizontal direction in the 2n−1th line in the vertical direction of the succeeding field image and the 2nth line of the current field image. The field difference d arithmetic operation section 36 outputs the sum total d of absolute value arithmetically operated in this manner to the decision section 37.

Referring back to FIG. 6, the decision section 37 receives a notification representative of which two frame images should be combined to produce a frame image from the 2·2 sequence detection section 25. If the notification from the 2·2 sequence detection section 25 indicates a combination of a preceding field image and a current field image, then the decision section 37 decides, based on the arithmetic operation results a and b which are arithmetic operation results of the field difference a arithmetic operation section 33 and field difference b arithmetic operation section 34, whether or not the interlaced signal inputted from the preceding stage has the characteristic of an interlaced signal obtained where two field images are produced from a single 240P original image.

On the other hand, if the notification from the 2·2 sequence detection section 25 indicates a combination of a current field image and a succeeding field image, then the decision section 37 decides, based on the arithmetic operation results c and d which are arithmetic operation results of the field difference c arithmetic operation section 35 and field difference d arithmetic operation section 36, whether or not the interlaced signal inputted from the preceding stage has the characteristic of an interlaced signal obtained where two field images are produced from a single 240P original image.

More particularly, the decision section 37 makes a decision based on the following idea. If the interlaced signal inputted to the original image 240P detection section 26 is an interlaced signal obtained where two field images are produced from a single 240P original image, then a combination of a preceding field image and a current field image or another combination of a current field image and a succeeding field image should have been produced from the single 240P original image.

Then, two successive field images produced from a single 240P original image have such a relationship that those pixels having equal coordinates in the horizontal direction in an even-numbered 2Xth line of one of the field images and in the other odd-numbered (2X+1th or 2X−1th) line have an equal value. Therefore, one of the two different sum totals of absolute value of differences arithmetically operated has a very low value, and exhibits the value 0 if no noise is generated in the process of production of the two field images from the one 240P original image. Accordingly, the quotient when a higher one of the two sum totals of absolute value of differences is divided by a lower one of the two sum totals is apparently higher than "1".

On the other hand, it has been confirmed that, if the two different sum totals of absolute value of differences are arithmetically operated with regard to two successive field images which are not produced from a single 240P original image, then values substantially equal to each other are obtained. Accordingly, the quotient when a higher one of the two sum totals of absolute value of differences is divided by a lower one of the two sum totals is close to "1".

Therefore, if the notification from the 2·2 sequence detection section 25 indicates a combination of a preceding field image and a current field image, then the arithmetic operation results a and b are compared with each other, and the quotient when a higher one of the arithmetic operation results is divided by a lower one of the arithmetic operation results is arithmetically operated. Then, if the quotient is equal to or higher than a predetermined threshold value α (for example, α=2.5, 5.0 or the like) which is higher than "1", then it is decided that the interlaced signal inputted from the preceding stage has a characteristic of an interlaced signal obtained where two field images are produced from a single 240P original image.

On the other hand, if the notification from the 2·2 sequence detection section 25 indicates a combination of a current field image and a succeeding field image, then the arithmetic operation results c and d are compared with each other, and the quotient when a higher one of the arithmetic operation results is divided by a lower one of the arithmetic operation results is arithmetically operated. Then, if the quotient is equal to or higher than the predetermined threshold value α higher than "1", then it is decided that the interlaced signal inputted from the preceding stage has a characteristic of an interlaced signal obtained where two field images are produced from a single 240P original image.

It is to be noted that the quotient described above can be utilized also for the decision of whether the interlaced signal inputted from the preceding stage originates from video material or film material. Accordingly, the quotient can be utilized also for the decision that the interlaced signal inputted from the preceding stage changes over from that of video material to that of film material or changes over reversely.

In summary, the decision section 37 of the original image 240P detection section 26 shown in FIG. 6 arithmetically operates the correlation value S of two successive field images of the interlaced signal in accordance with the following expressions:

$$p=\Sigma|f1(x,y)-f2(x,y-1)|$$

$$q=\Sigma|f1(x,y)-f2(x,y+1)|$$

$$S=p/q \text{ where } p>q$$

$$S=q/p \text{ where } q \geq p$$

where x is the horizontal coordinate of a pixel, y the vertical coordinate of the pixel, y−1 the vertical coordinate of another line immediately below the line of the vertical coordinate y, y+1 the vertical coordinate of a further line immediately above the line of the vertical coordinate y, f1 the pixel value of the coordinates in the parentheses of one of the field images, f2 the pixel value of the coordinates in the parentheses of the other field image, and Σ the total value. The pair of the value p and q correspond to the pair of the sum total of a and b, or the pair of the sum total of c and d in this embodiment.

Now, action of the IP conversion section 12 is described with reference to a flow chart of FIG. 9. An interlaced signal is inputted from the preceding stage to the IP conversion section 12 and supplied to the components of the IP conversion section 12 from the 2·3 pull-down inverse conversion section 21 to the original image 240P detection section 26. Then, processes at steps S1 to S6 described below are executed in parallel to one another.

In particular, referring to FIG. 9, the 2·3 pull-down inverse conversion section 21 converts, at step S1, an interlaced signal inputted thereto from the preceding stage into a progressive signal and outputs the progressive signal to the progressive signal selection section 27. At step S2, the 2·2 pull-down inverse conversion section 22 converts the interlaced signal inputted from the preceding stage into a progressive signal and outputs the progressive signal to the progressive signal selection section 27. At step S3, the motion adaptive IP conversion section 23 converts the interlaced signal inputted from the preceding stage into a progressive signal and outputs the progressive signal to the progressive signal selection section 27.

At step S4, the 3·2 sequence detection section 24 decides whether or not the interlaced signal inputted from the preceding stage has a characteristic of an interlaced signal produced by 3·2 pull-down telecine conversion. Then, if the 3·2 sequence detection section 24 decides that the interlaced signal inputted has the characteristic, then it outputs a 3·2 sequence detection signal to the progressive signal selection section 27. At step S5, the 2·2 sequence detection section 25 decides whether or not the interlaced signal inputted from the preceding stage has a characteristic of an interlaced signal produced by 2·2 pull-down telecine conversion. Then, if the 2·2 sequence detection section 25 decides that the interlaced signal inputted has the characteristic, then it outputs a 2·2 sequence detection signal to the progressive signal selection section 27. At step S6, the original image 240P detection section 26 decides whether or not the interlaced signal inputted from the preceding stage has a characteristic of an interlaced signal obtained where two field images are produced from a 240P original image. Then, if the original image 240P detection section 26 decides that the interlaced signal inputted has the characteristic, then it outputs an original image 240P detection signal to the progressive signal selection section 27.

At step S7, the progressive signal selection section 27 decides whether or not a 3·2 sequence detection signal is inputted thereto. If the progressive signal selection section 27 decides that a 3·2 sequence detection signal is inputted, then the processing advances to step S8, at which the progressive signal selection section 27 outputs the progressive signal inputted thereto from the 2·3 pull-down inverse conversion section 21 to the succeeding stage. If it is decided at step S7 that a 3·2 sequence detection signal is not inputted, then the processing advances to step S9.

At step S9, the progressive signal selection section 27 decides whether or not a 2·2 sequence detection signal is inputted thereto. If the progressive signal selection section 27 decides that a 2·2 sequence detection signal is inputted, then the processing advances to step S10, at which the progressive signal selection section 27 decides whether or not an original image 240P detection signal is inputted thereto. Then, if it is decided that an original image 240P detection signal is inputted, then the processing advances to step S11, at which the progressive signal selection section 27 outputs the progressive signal inputted thereto from the 2·2 pull-down inverse conversion section 22 to the succeeding stage.

It is to be noted that, if it is decided at step S9 that a 2·2 sequence detection signal is not inputted or if it is decided at step S10 that an original image 240P detection signal is not inputted, then the processing advances to step S12. At step S12, the progressive signal selection section 27 outputs the progressive signal inputted thereto from the motion adaptive IP conversion section 23 to the succeeding stage. The IP conversion section 12 acts in such a manner as described above.

As described above, in the IP conversion section 12, when an interlaced signal produced from a 240P original image is inputted, a 2·2 sequence detection signal is generated and also an original image 240P detection signal is generated. Consequently, not a progressive signal inputted from the 2·2 pull-down inverse conversion section 22 and having comparatively low picture quality but another progressive signal produced by motion adaptive IP conversion is outputted to the succeeding stage.

It is to be noted that the action of the 2·3 pull-down inverse conversion section 21 and the 2·2 pull-down inverse conversion section 22 may be stopped at a point of time when an original image 240P detection signal is outputted as a result of the process at step S6.

Further, while, in the embodiment described above, the present invention is applied to the resolution of 480I of the NTSC system, the present invention can be applied also to the resolution of 576I of the PAL system and the resolution of 1080I of the high definition television system.

It is anticipated that the present invention can achieve a comparatively high effect in Europe in which an interlaced signal of film material produced by 2·2 pull-down telecine conversion is broadcast frequently. In Europe, a signal not of 30 frames/second but 25 frames/second is used as an original image.

It is to be noted that the motion adaptive IP conversion section 23 may be replaced by a motion compensated (also called vector detected) IP conversion section which detects motion vectors between images and interpolates pixels based on the motion vectors. Where such a motion compensated IP conversion section as just mentioned is used, a progressive signal which is interpolated further appropriately in response to a motion of an image can be produced when compared with the case wherein the motion adaptive IP conversion section 23 is used.

It is to be noted that, in the present specification, the steps which are executed based on the program may be but need not necessarily be processed in a time series in the order as described, and include processes which are executed in parallel or individually without being processed in a time series.

While a preferred embodiment of the present invention has been described using specific terms, such description is for illustrative purpose, and it is to be understood that changes and variations may be made without departing from the spirit or scope of the following claims.

What is claimed is:

1. An image signal processing apparatus configured to convert an interlaced signal into a progressive signal, comprising:
   a first conversion unit configured to convert the interlaced signal into a progressive signal by 2·2 pull-down inverse conversion;
   a second conversion unit configured to convert the interlaced signal into a progressive signal by motion adaptive IP conversion;
   a decision unit configured to arithmetically operate a correlation value of two successive field images of the interlaced signal and decide based on the correlation value whether or not the two successive field images originate from a single frame image wherein the number of pixels in a vertical direction is equal to that of the field images; and
   a selection unit configured to select a result of the conversion by said first conversion unit or a result of the conversion by said second conversion unit in response to a result of the decision by said decision unit.

2. The image signal processing apparatus according to claim 1, wherein said decision unit arithmetically operates the correlation value in accordance with the following expressions:

$$p=\Sigma|f1(x,y)-f2(x,y-1)|$$

$$q=\Sigma|f1(x,y)-f2(x,y+1)|$$

$$S=p/q \text{ where } p>q$$

$$S=q/p \text{ where } q\geqq p$$

where x is the horizontal coordinate of a pixel; y the vertical coordinate of the pixel; y−1 the vertical coordinate of another line immediately below the line of the vertical coordinate y; y+1 the vertical coordinate of a further line immediately above the line of the vertical coordinate y; f1 the pixel value of the coordinates in the parentheses of one of the field images; f2 the pixel value of the coordinates in the parentheses of the other field image; Σ the total value; and S the correlation value.

3. The image signal processing apparatus according to claim 2, wherein said decision unit compares the correlation value with a predetermined threshold value to decide whether or not the two successive field images originate from a single frame image wherein the number of pixels in the vertical direction is equal to that of the field images.

4. The image signal processing apparatus according to claim 1, wherein said second conversion unit uses not the motion adaptive IP conversion but motion compensated IP conversion, wherein a pixel is interpolated based on a motion vector between images, to convert the interlaced signal into a progressive signal.

5. An image signal processing method for an image signal processing apparatus configured to convert an interlaced signal into a progressive signal, comprising the steps of:
   converting the interlaced signal into a progressive signal by 2·2 pull-down inverse conversion;
   converting the interlaced signal into a progressive signal by motion adaptive IP conversion;
   arithmetically operating a correlation value of two successive field images of the interlaced signal and deciding based on the correlation value whether or not the two successive field images originate from a single frame image wherein the number of pixels in a vertical direction is equal to that of the field images; and
   selecting a result of the first conversion or a result of the second conversion in response to a result of the decision.

6. A non-transitory computer-readable medium including a program, which when executed by a computer, causes the computer to perform a method of converting an interlaced signal into a progressive signal, said method comprising:
   converting the interlaced signal into a progressive signal by 2·2 pull-down inverse conversion;
   converting the interlaced signal into a progressive signal by motion adaptive IP conversion;
   arithmetically operating a correlation value of two successive field images of the interlaced signal and deciding based on the correlation value whether or not the two successive field images originate from a single frame image wherein the number of pixels in a vertical direction is equal to that of the field images; and
   selecting a result of the first conversion or a result of the second conversion in response to a result of the decision.

* * * * *

UNITED STATES PATENT AND TRADEMARK OFFICE
CERTIFICATE OF CORRECTION

PATENT NO. : 7,868,948 B2  
APPLICATION NO. : 11/517249  
DATED : January 11, 2011  
INVENTOR(S) : Tetsuro Tanaka Page 1 of 1

It is certified that error appears in the above-identified patent and that said Letters Patent is hereby corrected as shown below:

On the title page, Item (54), and column 1, in the Specifications should read:

-- (54) IMAGE SIGNAL PROCESSING APPARATUS, IMAGE SIGNAL PROCESSING METHOD AND PROGRAM FOR CONVERTING AN INTERLACED SIGNAL INTO A PROGRESSIVE SIGNAL --

Signed and Sealed this  
Eighth Day of March, 2011

David J. Kappos  
*Director of the United States Patent and Trademark Office*